US009506594B2

(12) United States Patent
Alotaibi et al.

(10) Patent No.: US 9,506,594 B2
(45) Date of Patent: Nov. 29, 2016

(54) METHOD FOR HOT-TAP TIE IN FOR LARGE DIAMETER PIPES

(71) Applicants: Yanbu Aramco Sinopec Refining Company Ltd. (YASREF), Yanbu Industrial (SA); Power and Water Utility Company for Jubail and Yanbu (MARAFIQ), Yanbu Industrial (SA)

(72) Inventors: Mathkar S. Alotaibi, Yanbu RC (SA); Clarence P. Leu, Houston, TX (US); Salman R. Almotairi, Yanbu RC (SA); Salamah Al-Suraihi, Yanbu RC (SA); Ali A. Almalki, Yanbu RC (SA)

(73) Assignees: Yanbu Aramco Sinopec Refining Company Ltd. (YASREF), Yanbu Industrial (SA); Power and Water Utility Company for Jubail and Yanbu (MARAFIQ), Yanbu Industrial (SA)

( * ) Notice: Subject to any disclaimer, the term of this patent is extended or adjusted under 35 U.S.C. 154(b) by 79 days.

(21) Appl. No.: 14/565,390

(22) Filed: Dec. 9, 2014

(65) Prior Publication Data
US 2016/0146389 A1 May 26, 2016

Related U.S. Application Data

(60) Provisional application No. 62/083,857, filed on Nov. 24, 2014.

(51) Int. Cl.
*F16L 41/06* (2006.01)
(52) U.S. Cl.
CPC ........... *F16L 41/06* (2013.01); *Y10T 137/6123* (2015.04)

(58) Field of Classification Search
CPC ......... F16L 41/06; F16L 41/04; F16L 41/16; Y10T 137/6123; Y10T 137/612
USPC .................................................. 137/317, 318
See application file for complete search history.

(56) References Cited

U.S. PATENT DOCUMENTS

| | | | |
|---|---|---|---|
| 2,115,992 A | 5/1938 | Koppl | |
| 2,151,594 A | 3/1939 | Grantham | |
| 2,601,434 A | 6/1952 | Du Bois | |
| 3,827,448 A * | 8/1974 | Alba | F16L 1/26 137/15.11 |
| 4,680,848 A | 7/1987 | Goldner | |
| 5,775,390 A * | 7/1998 | Mohn | B63B 25/082 114/50 |
| 5,882,045 A * | 3/1999 | Bravo | B65D 90/105 141/311 A |
| 5,971,001 A * | 10/1999 | Andersson | F16L 41/06 137/15.12 |
| 6,012,878 A | 1/2000 | Hicks | |
| 6,648,562 B1 | 11/2003 | Calkins et al. | |
| 7,901,162 B2 | 3/2011 | German | |
| 8,616,811 B2 * | 12/2013 | Clark, II et al. | E21B 29/12 137/318 |
| 8,707,979 B2 * | 4/2014 | McGraw et al. | E21B 29/12 137/15.12 |

FOREIGN PATENT DOCUMENTS

WO    03002902 A1    1/2003

* cited by examiner

*Primary Examiner* — Kevin Lee
(74) *Attorney, Agent, or Firm* — Snell & Wilmer L.L.P.

(57) ABSTRACT

A method is presented for joining a first pipe to the wall of a second pipe. The second pipe contains a first fluid. The first pipe has an open end and a closed end. The method includes abutting the open end of the first pipe against the wall of the second pipe to create an abutment, forming a fluid-tight seal around the abutment, filling the first pipe with a second fluid, and creating an opening in the wall of the second pipe by cutting a section of the wall of the second pipe enclosed by the abutment. The second fluid may have the same pressure as the first fluid.

11 Claims, 5 Drawing Sheets

METHOD FOR HOT-TAP TIE IN FOR LARGE DIAMETER PIPES

CROSS-REFERENCE TO RELATED APPLICATIONS

This patent application claims priority pursuant to 35 U.S.C. §119(e) to U.S. provisional patent application No. 62/083,857, filed Nov. 24, 2014, which application is incorporated herein in its entirety, by reference.

FIELD OF THE INVENTION

The present invention generally relates to methods and apparatuses for connecting a pipe to another pipe. In particular, the present invention is related to "hot-tapping" methods for joining a connecting pipe to an existing pipe containing or conveying a fluid.

BACKGROUND OF THE INVENTION

The term "hot-tapping", as used herein, generally refers to methods for joining a first pipe to a second pipe containing or conveying a fluid without draining the fluid inside the second pipe.

Various "hot-tapping" methods for joining a connecting pipe to an existing pipe are known. Such "hot-tapping" methods are particularly useful in situations where it is desirable or necessary to join the connecting pipe to the existing pipe without stopping the flow of and/or draining the fluid inside the existing pipe. Such a connection method is particularly important when flow in the existing pipe is regulated for various downstream purposes.

Some attempts have been made at providing apparatuses and methods for "hot-tapping" pipes.

For example, PCT application publication number WO 03/002902, which is incorporated herein by reference in its entirety, describes a method and an apparatus for establishing a connection point in a pipeline containing fluid under pressure. The apparatus includes a mounting device for mounting the apparatus on a pipeline, an inner pipe that is inserted into a transition section of the mounting device, and a valve and a borer connected to one end of the inner pipe. The apparatus further includes a pretensioning device for pretensioning a seal located at the other end of the inner pipe against the pipeline. The method includes assembling the device on the pipeline, pretensioning the seal, conducting pressure tests, penetrating the pipeline with the borer, partly withdrawing the borer, closing the valve, and completely withdrawing the borer. The method may include additional steps, such as blanking or creating further pipeline connections.

In another example, U.S. Pat. No. 4,680,848 to Goldner, which is incorporated herein by reference in its entirety, describes a pipe tapping machine for cutting a hole in a pressurized main pipe wall. In use, the pipe tapping machine is mounted to a branch pipe, which is held against the main pipe wall using a removable clamp. The machine is described as including a valved port for conducting leak testing of the branch pipe prior to cutting and for venting the fluid after a hole is cut.

In yet another example, U.S. Pat. No. 6,012,878 to Hicks, which is incorporated herein by reference in its entirety, describes an apparatus and method for tapping a pressurized pipe-line located underwater. The tapping apparatus described in the reference includes means for equalizing the interior pressure of the boring bar housing to match the internal pressure of a pipeline being penetrated as an opening in the pipeline is cut by a rotating circular cutter.

However, these prior art apparatuses and methods described above are primarily directed to tapping pipes of smaller diameters and cannot be readily implemented for "hot-tapping" large diameter pipes. Typically, for such large diameter pipes, a conventional connection method is followed, which involves diverting or stopping the flow of fluid through a section of the existing pipe, draining the section of the existing pipe of fluid, and then joining the connecting pipe to the drained section of the existing pipe. As discussed above, stopping the flow of fluid in such large diameter pipes can significantly impact the operation of the facilities being serviced by these pipes. Further, it is often difficult and/or costly to install temporary piping for diverting the flow of fluid due to the volume and pressure of the fluid being carried by most large diameter pipes.

Accordingly, there exists a need for an improved method for joining a connecting pipe to an existing pipe containing fluid without disrupting the flow of fluid in the existing pipe.

SUMMARY OF THE INVENTION

In one aspect, the present invention provides a method for joining a first pipe to the wall of a second pipe. The second pipe contains a first fluid. The first pipe has an open end and a closed end. The method includes abutting the open end of the first pipe against the wall of the second pipe to create an abutment. A fluid-tight seal is then formed around the abutment. The first pipe is filled with a second fluid. The second fluid may have the same pressure as the first fluid. An opening in the wall of the second pipe is created by cutting a section of the wall of the second pipe enclosed by the abutment.

BRIEF DESCRIPTION OF THE DRAWINGS

The features of the invention will become more apparent in the following detailed description in which reference is made to the appended drawings, wherein.

DETAILED DESCRIPTION OF THE INVENTION

Figure 1:
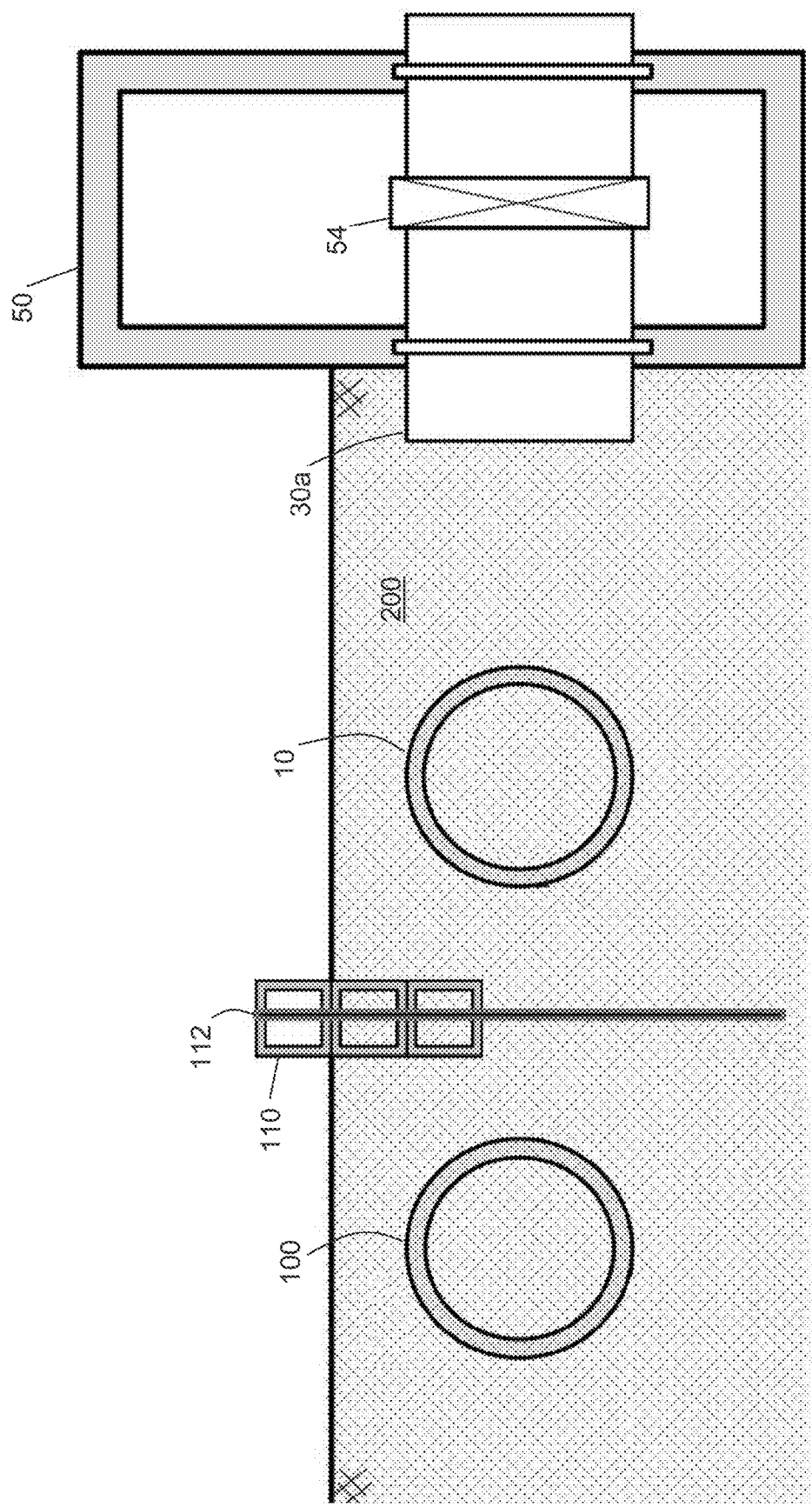
FIGS. 1 to 5 schematically illustrate the method for joining a connecting pipe to an existing pipe located underground according to one embodiment of the invention.

As used herein, the term "pipe" will be generally understood to refer to a conduit for carrying fluids. Further, unless otherwise specified, the term "pipe" will be understood to refer to a unitary structure or a combination of structural units as discussed below.

The term "abutment" will be understood to refer to the location(s) at which two or more abutting structures meet. For example, in the case of a first pipe being oriented generally perpendicularly with respect to a second pipe with one end of the first pipe abutting against the wall of the second pipe, an abutment would be formed by the end of the first pipe meeting the wall of the second pipe.

As used herein, the term "open end" will generally be understood to refer to an end of a pipe which is uncovered. The open end of a pipe does not mean that the edge of the open pipe must be circular in end view. Thus, an open end may have a "saddle" or other shape. Generally, an open end as used herein means that the end of the pipe is adapted to connect or engage the wall of another pipe.

As used herein, the term "closed end" will generally be understood to refer to an end of a pipe which is covered or sealed to prevent fluid from flowing in or out of the pipe from that end.

The terms "comprise", "comprises", "comprised" or "comprising" may be used in the present specification. As used herein (including the description and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

In one aspect, a method for joining a first pipe having an open end to a second pipe containing a first fluid is provided. The method generally comprises abutting the open end of the first pipe against the wall of the second pipe to create an abutment, forming a fluid-tight seal at the abutment, filling the first pipe with a second fluid, and creating an opening by cutting a section of the second pipe wall enclosed by the abutment. In one aspect, the open end of the first pipe may be adapted to be joined to the wall of the second pipe. For example, the open end may be shaped to match the contour of the wall of the second pipe to reduce any gap which may form between the first pipe and the second pipe when the pipes are abutted. In one embodiment, the open end may be saddle-shaped. In a preferred embodiment, the fluid-tight seal at the abutment is formed by covering at least the regions of the second pipe and the first pipe adjacent to or near the abutment with one or more laminate layers. The one or more laminate layers are generally used to secure the abutting pipes to each other and to seal the joint formed between the abutting pipes. In one aspect, the one or more laminate layers comprise fiberglass and resin.

Once the fluid-tight seal has been formed, the first pipe is filled with fluid. In one embodiment, the first pipe is filled by penetrating the portion of the second pipe wall enclosed by the abutment such that the first fluid may flow from the second pipe to the first pipe. The second fluid may be the same as the first fluid. For example, the first fluid and/or the second fluid may be water or seawater. The pressure of the first fluid may be the same as that of the second fluid. Upon filling the first pipe, the section of the wall of the second pipe which is enclosed by the abutment may be cut, for example, by an operator from inside the first pipe. The operator may be a diver. Preferably, the cut portion of the wall is then retrieved. The first pipe may be provided with a manhole, which, for example, may be used by the operator to enter and exit the first pipe and/or for retrieving the cut portion of the second pipe wall. The first pipe may also be provided with a valve, which may be used to control the flow of the fluid inside the first pipe.

In one aspect, the method may further comprise the optional step of excavating the area surrounding the second pipe. For example, the second pipe may be located underground. Further, the method may also optionally comprise, prior to excavating, installing a retaining wall at a perimeter of the area to be excavated.

In another aspect, the method may optionally comprise, prior to filling the first pipe with fluid, installing a thrust block for securing the first pipe and the second pipe in position.

The method according to one embodiment of the invention is illustrated in FIGS. 1 to 5. As illustrated in FIG. 1, both an existing pipe 10 and a first connecting pipe segment 30a may be located underground. The first connecting pipe segment 30a is illustrated as having a valve chamber 50 and a valve 54 installed thereon.

Figure 2:
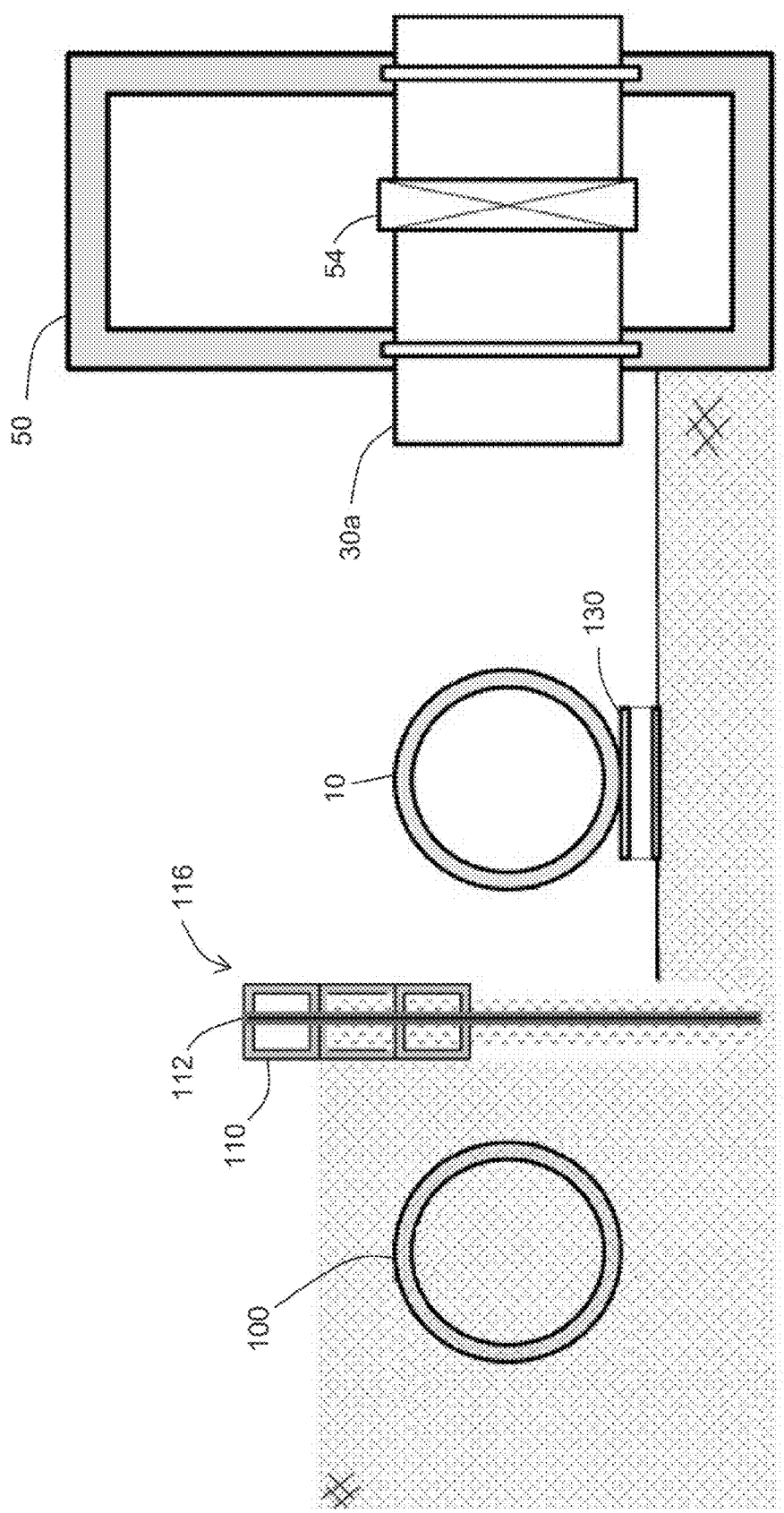

To prepare for joining the pipes, the area around the existing pipe 10 and the first connecting pipe segment 30a is excavated. In the illustrated embodiment, a retaining wall may optionally be built prior to excavation at a perimeter of an excavation site 200 in order to isolate the excavation site 200 and to support the soil around the excavation site 200. For example, trench boxes 110, tension rods 112 and cement may be introduced into the desired area to build the retaining wall 116, which is illustrated in FIG. 2. It will be appreciated that the retaining wall 116 may be particularly useful in cases where it is desirable to prevent or mitigate the likelihood of disturbing the nearby soil and damaging other underground pipes and/or equipment, such as a neighbouring pipe 100 or other structures.

Once the retaining wall 116 has been completed, the area surrounding the existing pipe 10 and the first connecting pipe segment 30a is excavated as illustrated in FIG. 2. As the existing pipe 10 and the first connecting pipe segment 30a are excavated, one or more pipe supports 130 may be installed between the excavated ground and the existing pipe 10 and/or the first connecting pipe segment 30a. For example, the one or more pipe supports 130 may comprise steel supports and concrete sleepers. As will be understood, the one or more pipe supports 130 will aid in supporting the pipe(s) during the tapping process as discussed further below.

Figure 3:
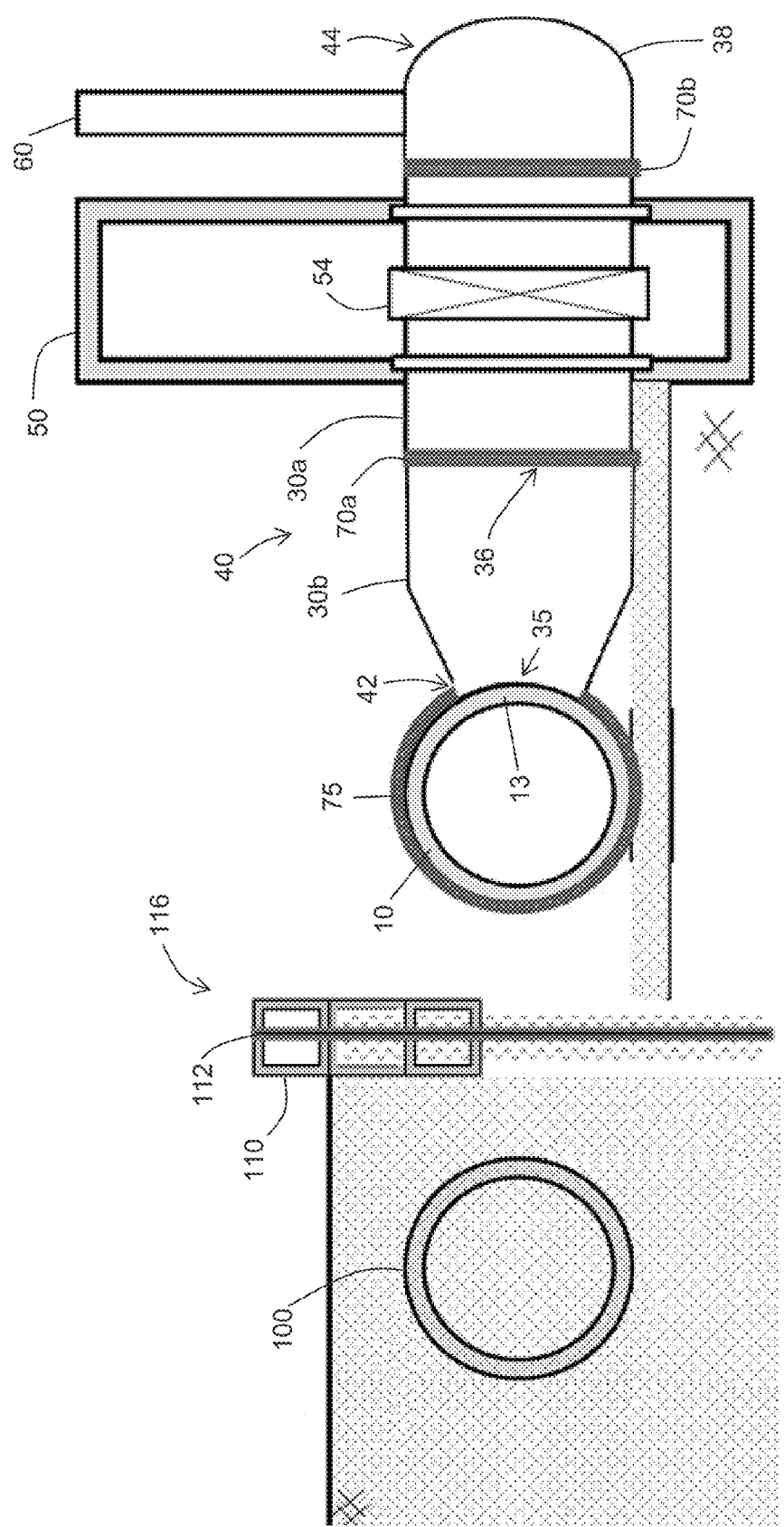

As illustrated in FIG. 3, a second connecting pipe segment 30b is positioned between the first connecting pipe segment 30a and the existing pipe 10, and the second connecting pipe segment 30b is joined to the first connecting pipe segment 30a by a first joint 70a. The second connecting pipe segment 30b is illustrated as being a concentric reducer having a first end 35 with a smaller diameter than the opposite, second end 36. An end cap 38 including a manhole structure 60 is also joined to the first connecting pipe segment 30a by a second joint 70b, thereby forming a connecting pipe 40. The first joint 70a and/or the second joint 70b may comprise a weld or other known pipe connecting means. For further clarity and ease of reference, the structure formed by joining the first connecting pipe segment 30a, the second connecting pipe segment 30b and the end cap 38 may collectively be referred to as the connecting pipe 40 herein. As illustrated in FIG. 3, the connecting pipe 40 has an open end 42 comprising the first end 35 of the second connecting pipe segment 30b, and a closed end 44 formed by the end cap 38. The open end 42 is connected to the wall of the existing pipe 10. For this purpose, the open end 42 may preferably be adapted to facilitate such connection. In one embodiment, the open end 42 may be "saddle" shaped, such that the profile of the open end 42 matches the contour or curvature of the wall of the existing pipe 10.

The open end 42 of the connecting pipe 40 is abutted against the wall of the existing pipe 10 to form a joint and a fluid-tight seal is then formed at the joint. In the illustrated embodiment, the fluid-tight seal is created by one or more laminate layers 75. For example, the one or more laminate layers 75 comprising fiberglass and resin may be applied onto the exterior surfaces of the existing pipe 10 and the connecting pipe 40 to seal the joint. The joints 70a and 70b may also be sealed in a similar fashion by laminating the exterior and/or interior surfaces of the connecting pipe segments 30a, 30b and the end cap 38 with one or more laminate layers comprising fiberglass and resin.

Figure 4:
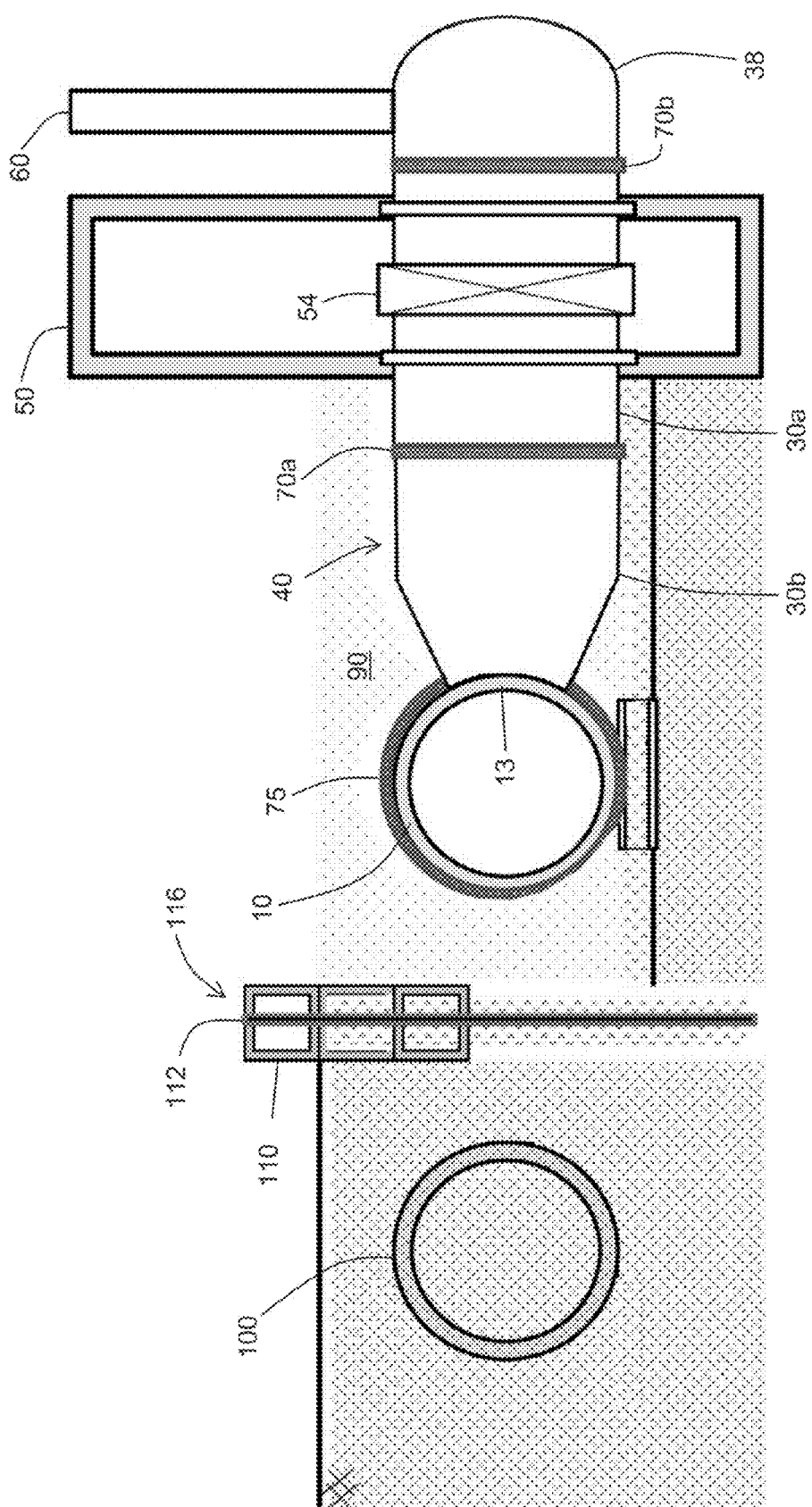

Once the fluid-tight seal has been formed at the joint of the existing pipe 10 and the connecting pipe 40, the connecting pipe 40 may be filled with fluid as discussed below. However, it will be appreciated that prior to filling the connecting pipe 40 with fluid, the existing pipe 10 and/or the connecting pipe 40 may optionally be restrained or secured in position to prevent or mitigate unwanted pipe movements. For example, a thrust block 90 may be installed or constructed in the area surrounding the existing pipe 10 and the connecting pipe 40 between the retaining wall 116 and the valve chamber 50 as illustrated in FIG. 4. In particular, the thrust block serves to secure the joint between the existing pipe 10 and the connecting pipe 40 so as to reduce or prevent any relative movement therebetween.

Figure 5:
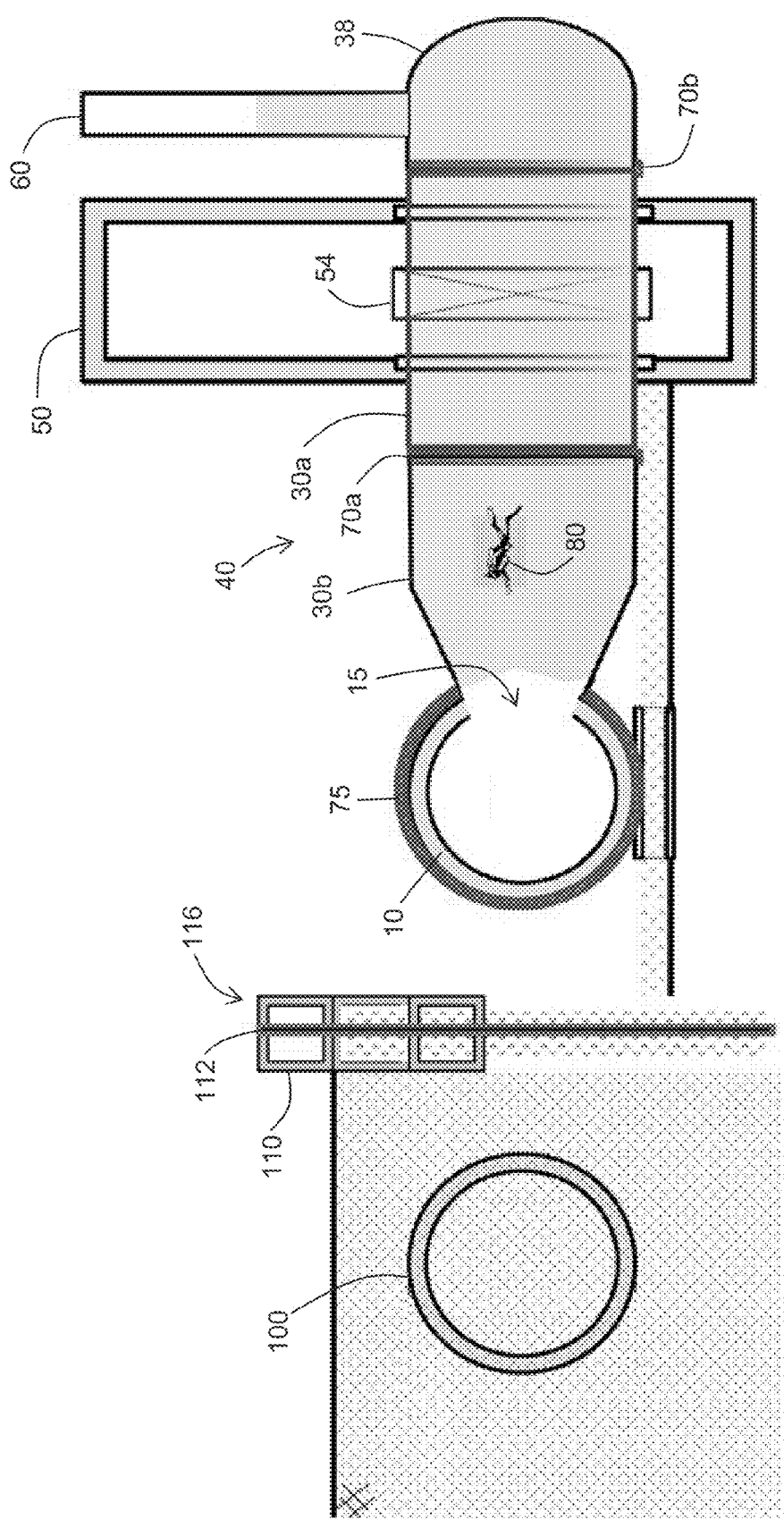

In one embodiment, the connecting pipe 40 may be filled with fluid, such as water or seawater, and, if necessary, the fluid may be pressurized such that the pressure of the fluid inside the connecting pipe 40 is substantially equal to the pressure of the fluid inside the existing pipe 10. In another embodiment, the connecting pipe 40 may be filled with fluid by penetrating a portion of the existing pipe wall 13 within the joint to enable the fluid contained in the existing pipe 10 to flow into the connecting pipe 40. It will be appreciated that filling the connecting pipe 40 in this way would result in the fluid in both the existing pipe 10 and the connecting pipe 40 having substantially the same pressure. In the illustrated embodiment, the fluid being conveyed by the existing pipe 10 is seawater and thus the connecting pipe 40 is filled with seawater. Once the connecting pipe 40 has been filled, a diver 80 may enter into the connecting pipe 40 through the manhole structure 60 to manually cut the section of the existing pipe wall 13 enclosed within the joint to create an opening 15. FIG. 5 illustrates the diver 80 inside the connecting pipe 40 once the section of the existing pipe wall has been cut and the opening 15 has been created. For clarity, the thrust block 90 is not illustrated in FIG. 5. It will be appreciated that the portion of the wall 13 cut by the diver 80 is the section of the existing pipe 10 which is sealed by the open end 42 of the connecting pipe 40.

In a preferred embodiment, the cut portion of the wall 13 may be retrieved from the connecting pipe 40. For example, the cut portion of the wall 13 may optionally be further cut into smaller pieces and removed through the manhole structure 60.

In a further preferred embodiment, once the diver 80 and the cut portion of the wall 13 have been removed from inside the connecting pipe 40, the valve 54 may be closed and any fluid present in the region of the connection pipe 40 between the closed valve 54 and the end cap 38 may be drained. The end cap 38 may then be removed to create a tie-in point for attaching additional pipes to the connection pipe 40 as desired.

It will be understood that although the connecting pipe 40 has been described herein as comprising a plurality of pipe segments and components, the connecting pipe may also be formed as a single unitary structure. It will also be appreciated that although the method according to the present invention has been described herein with reference to pipes, the method may be similarly applied for joining a connecting pipe to vessels and other structures containing fluids.

It will also be appreciated that although the method according to the illustrated embodiment has been described with reference to divers and operators, various aspects of the method, including cutting the existing pipe wall, may be performed using various manual or remotely controlled devices, such as a remotely operated underwater vehicle (ROV).

Furthermore, although the existing pipe and the first connecting pipe segment are located underground in the embodiment illustrated herein, it will be understood that the method according to the present invention may be similarly applied for joining pipes located above ground or underwater.

It will also be appreciated that while the connecting pipe and the existing pipe are illustrated as being oriented perpendicularly with respect to each other in the illustrated embodiment, the pipes may be oriented at any other angle with respect to each other. Further, it will be appreciated that although the connecting pipe and the existing pipe are both illustrated as being generally straight in the illustrated embodiment, the pipes may be shaped in any other way. For example, the pipes may contain branched, curved and/or bent segments.

Aspects of the invention will now be illustrated with reference to the following example, which is not intended to limit the scope of the invention in any way.

EXAMPLE

In the example, the method as described above was used to install a tie-in connection to an existing seawater return pipe having a diameter of 3 meters. Prior to installation, a valve chamber containing a connecting pipe segment and a butterfly valve for controlling the flow of fluid inside the connecting pipe segment was constructed and placed on-site. An end cap and a manhole were then installed on one end of the connecting pipe segment. The diameter of the connecting pipe segment was 2.9 meters.

Micro-piling was used to construct a retaining wall to reduce the likelihood of damaging a seawater supply pipe located near the excavation site during digging. Specifically, 3 levels of steel trench boxes were inserted manually into the ground at a desired location, and a PVC sleeve was then installed inside the steel trench boxes. Micro-pile casings having a diameter of 200 mm were then installed inside the sleeves and the trench boxes, and the retaining wall was completed by inserting tension rods and pouring cement inside the casings.

The area between the retaining wall and the valve chamber was then excavated to expose the seawater return pipe. As the area surrounding the seawater return pipe was excavated, concrete sleepers and steel supports were installed to support the exposed segments of the seawater return pipe. Once the area between the seawater return pipe and the valve chamber was cleared, a concentric pipe reducer was lowered and positioned between the open end of the connecting pipe segment and the seawater return pipe, such that the reduced end of the concentric pipe reducer abutted against the seawater return pipe. The concentric pipe reducer had a diameter of 2.1 meters on the reduced end and 2.9 meters on the other end. The concentric pipe reducer was then secured to the seawater return pipe at the reduced end and to the connecting pipe segment at the other end using fiberglass laminate layers. Specifically, the pipe surfaces were prepared by cleaning and sanding, and then fiberglass layers in the form of chopped strand mats and woven roving were impregnated with resin and used to cover the pipe joints. During the application of resin-impregnated fiberglass layers, tension was applied against the surface of the fiberglass layers using a roller to reduce the amount of air trapped between the fiberglass layers. After the final layer of resin-impregnated fiberglass was applied to the joints, the exterior surfaces of the laminated portions of the pipes were smoothed using a scraper.

A thrust block was then constructed to surround the existing seawater return pipe and the connecting pipe segments. In particular, reinforcement structures and shuttering were installed around the pipes such that concrete may be poured to cover the concentric pipe reducer and the area surrounding the joint between the seawater return pipe and the concentric pipe reducer.

Once the concrete had cured and the thrust block was in place, pneumatic grinders were used by operators inside the concentric pipe reducer to grind and thus reduce the wall thickness of the portion of the seawater return pipe to be cut. Handles were also mounted to the portion of the seawater return pipe to be cut in order to facilitate the retrieval of the cut portion of the wall once cutting was completed. A deep cut was then made by the operator to the portion of the seawater return pipe to be cut, thus enabling the seawater flowing inside the seawater return pipe to flow into the concentric pipe reducer and the connecting pipe segment. The operators exited the pipe to allow for the concentric pipe reducer and the connecting pipe segment to be filled with seawater.

Upon the pressure inside the pipes being equalized, the portion of the seawater return pipe enclosed by the concentric pipe reducer was manually cut by divers who entered inside the connecting pipe segment and the concentric pipe reducer through the manhole. The cutting was performed manually underwater until the cut portion of the wall was completely detached from the remaining seawater return pipe. The cut portion of the wall was then retrieved through the manhole, the divers exited the pipes and the valve was closed to seal off the section between the closed valve and the end cap. The sealed-off section was then dewatered using a pump and the end cap was removed to enable additional pipe segments to be joined to the connecting pipe segment.

Although the invention has been described with reference to certain specific embodiments and examples, various modifications thereof will be apparent to those skilled in the art. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

We claim:

1. A method for joining a first pipe to a second pipe, the second pipe having a wall and containing a first fluid, the first pipe having an open end and a closed end, the method comprising:
    (a) abutting the open end of the first pipe against the wall of the second pipe to create an abutment;
    (b) forming a fluid-tight seal around the abutment;
    (c) filling the first pipe with a second fluid; and
    (d) creating an opening in the wall of the second pipe by cutting a section of the wall of the second pipe enclosed by the abutment, wherein step (d) is conducted by a diver located inside the first pipe.

2. The method according to claim 1, wherein step (b) comprises covering at least the regions of the second pipe and the first pipe adjacent to the abutment with one or more laminate layers.

3. The method according to claim 2, wherein the one or more laminate layers comprise fiberglass and resin.

4. The method according to claim 1, wherein the second fluid is the same as the first fluid.

5. The method according to claim 4, wherein step (c) comprises penetrating the wall of the second pipe enclosed by the abutment, thereby enabling the first fluid to fill the first pipe.

6. The method according to claim 1, further comprising retrieving the cut section of the wall of the second pipe.

7. The method according to claim 1, further comprising, prior to step (a), excavating the area surrounding the second pipe.

8. The method according to claim 7, further comprising, prior to excavating, installing a retaining wall at a perimeter of the area to be excavated.

9. The method according to claim 1, further comprising, prior to step (c), installing a thrust block for securing the first pipe and the second pipe in position.

10. The method according to claim 1, wherein the open end of the first pipe is adapted to be joined to the wall of the second pipe.

11. The method according to claim 10, wherein the open end of the first pipe is saddle-shaped to match the contour of the wall of the second pipe.

* * * * *